US012679930B2

United States Patent
(12) United States Patent
Bachmann et al.

(10) Patent No.: US 12,679,930 B2
(45) Date of Patent: Jul. 14, 2026

(54) PROCESS FOR PRODUCING POLYCARBONATE—POINT OF ADDITION OF THE CHAIN TERMINATOR

(71) Applicant: Covestro Intellectual Property GmbH & Co. KG, Leverkusen (DE)

(72) Inventors: Rolf Bachmann, Bergisch Gladbach (DE); Antonio Ortiz, Duisburg (DE); Josef Bartholomei, Brüggen (DE); Marten Voelker, Neuss (DE); Jan Heijl, Lokeren (BE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 651 days.

(21) Appl. No.: 17/437,194

(22) PCT Filed: Mar. 30, 2020

(86) PCT No.: PCT/EP2020/058893
§ 371 (c)(1),
(2) Date: Sep. 8, 2021

(87) PCT Pub. No.: WO2020/201179
PCT Pub. Date: Oct. 8, 2020

(65) Prior Publication Data

US 2022/0169787 A1 Jun. 2, 2022

(30) Foreign Application Priority Data

Apr. 3, 2019 (EP) .................................... 19166945

(51) Int. Cl.
*C08G 64/14* (2006.01)
*C08G 64/24* (2006.01)

(52) U.S. Cl.
CPC ............. *C08G 64/14* (2013.01); *C08G 64/24* (2013.01)

(58) Field of Classification Search
None
See application file for complete search history.

(56) References Cited

U.S. PATENT DOCUMENTS 4,737,573 A * 4/1988 Silva ...................... C08G 64/28 528/370
5,200,496 A * 4/1993 Munjal .................. C08G 64/24 528/196

(Continued)

FOREIGN PATENT DOCUMENTS

EP 0408924 A2 1/1991
EP 0517044 A2 12/1992

(Continued)

OTHER PUBLICATIONS

International Search Report for International Patent Application No. PCT/EP2020/058893, mailed Apr. 22, 2020. (English translation attached).

(Continued)

*Primary Examiner* — Ha S Nguyen
(74) *Attorney, Agent, or Firm* — K&L Gates LLP

(57) ABSTRACT

The present invention relates to a process for producing polycarbonate according to a phase boundary process, from at least one dihydroxydiaryl alkane, phosgene, at least one catalyst and at least one chain terminator, the process producing polycarbonate with a low proportion of oligomers and a low proportion of Di-chain terminator carbonate. The process according to the invention is characterized in that the chain terminator is added to the reaction system at a designated time.

18 Claims, 1 Drawing Sheet

(56) References Cited

U.S. PATENT DOCUMENTS

| | | | | | |
|---|---|---|---|---|---|
| 5,426,170 | A * | 6/1995 | Hirao | C08G 64/28 | 528/196 |
| 6,225,436 | B1 * | 5/2001 | Eiffler | C08G 64/24 | 528/196 |
| 2005/0020804 | A1 * | 1/2005 | Rohde | C08G 64/20 | 528/196 |
| 2011/0224372 | A1 * | 9/2011 | Jueptner | C08G 64/24 | 528/196 |

FOREIGN PATENT DOCUMENTS

| | | |
|---|---|---|
| JP | H03109420 | 5/1991 |
| JP | H05214236 | 8/1993 |
| JP | 2013014728 | 1/2013 |

OTHER PUBLICATIONS

Written Opinion for International Patent Application No. PCT/EP2020/058893, mailed Apr. 22, 2020.

* cited by examiner

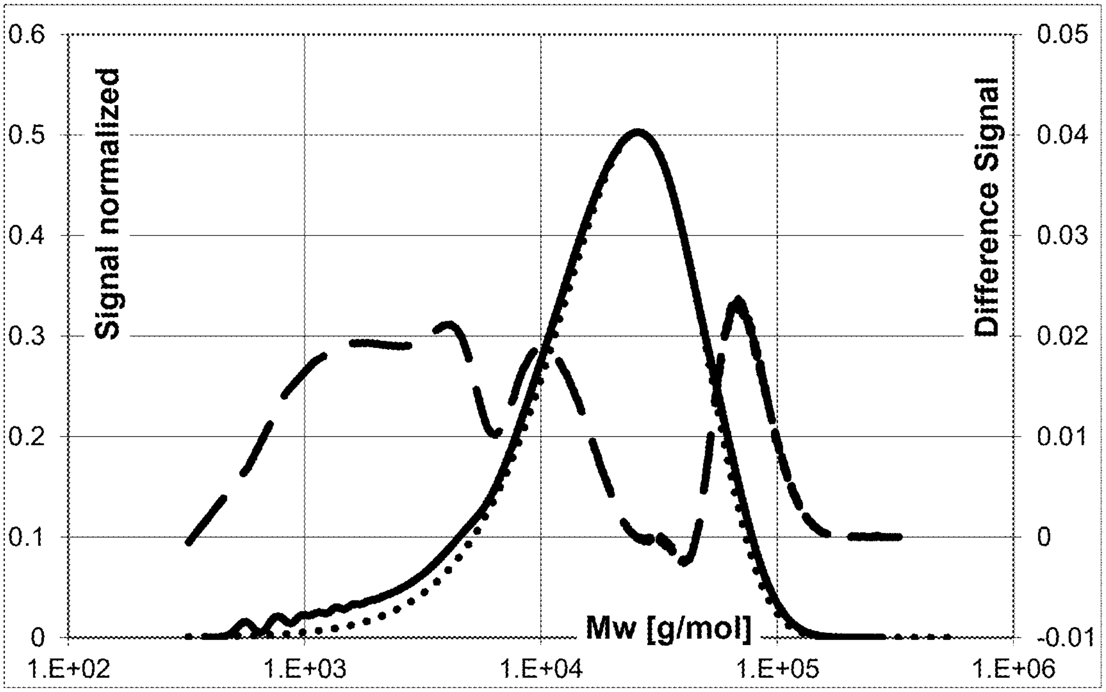
0.6
0.5
0.4
0.3
0.2
0.1
0
Signal normalized
Difference Signal
0.05
0.04
0.03
0.02
0.01
0
-0.01
Mw [g/mol]
1.E+02
1.E+03
1.E+04
1.E+05
1.E+06

PROCESS FOR PRODUCING POLYCARBONATE—POINT OF ADDITION OF THE CHAIN TERMINATOR

CROSS REFERENCE TO RELATED APPLICATIONS

This application is a U.S. national stage application, filed under 35 U.S.C. § 371, of International Application No. PCT/EP2020/058893, which was filed on Mar. 30, 2020, and which claims priority to European Patent Application No. 19166945.6, which was filed on Apr. 3, 2019. The contents of each are hereby incorporated by reference into this specification.

FIELD

The present invention relates to a process for producing polycarbonate by the interfacial process from at least one dihydroxydiarylalkane, phosgene, at least one catalyst, and at least one chain terminator, the process comprising polycarbonate having a low proportion of oligomers and a low proportion of di-chain terminator carbonate.

BACKGROUND

Polycarbonate production by the interfacial process has previously been described by Schnell "Chemistry and Physics of Polycarbonates", Polymer Reviews, volume 9, Interscience Publishers, New York, London, Sydney 1964, pp. 33-70; D. C. Prevorsek, B. T. Debona and Y. Kesten, Corporate Research Center, Allied Chemical Corporation, Morristown, New Jersey 07960: "Synthesis of Poly(ester Carbonate) Copolymers" in Journal of Polymer Science, Polymer Chemistry Edition, vol. 18, (1980); pp. 75-90, D. Freitag, U. Grigo, P. R. Müller, N. Nouverne', BAYER AG, "Polycarbonates" in Encyclopedia of Polymer Science and Engineering, volume 11, second edition, 1988, pp. 651-692 and finally by Dres U. Grigo, K. Kircher and P. R. Müller "Polycarbonate" [Polycarbonates] in Becker/Braun, Kunststoff Handbuch [Plastics handbook], volume 3/1, Polycarbonates, polyacetals, polyesters, cellulose esters, Crul Hanser Verlag Munich, Vienna 1992, pp. 118-145.

The interfacial process for producing polycarbonate is additionally also described in EP-A 0517044.

The process generally comprises phosgenation of a disodium salt of a bisphenol or of a mixture of different bisphenols initially charged in aqueous alkaline solution or suspension in the presence of an inert organic solvent or solvent mixture that forms a second organic phase in addition to the aqueous phase. The resulting oligocarbonates primarily present in the organic phase undergo condensation with the aid of suitable catalysts to afford high-molecular-weight polycarbonates dissolved in the organic phase, wherein the molecular weight may be controlled by suitable chain terminators (for example monofunctional phenols). The organic phase is finally separated and the polycarbonate isolated therefrom by various processing steps.

The properties of the resulting polycarbonate (PC) are influenced by the oligomer proportion in the PC and also the proportion of the di-chain terminator carbonate. The term "di-chain terminator carbonate" is according to the invention understood as meaning a compound formed by reaction of two chain terminator molecules with phosgene to form a carbonate. The PC properties that are influenced thereby include impact strength, glass transition temperature, and behavior at elevated temperatures. Low-molecular-weight compounds can also result in bleaching during production of CDs. It should also be noted that the formation of a di-chain terminator carbonate causes a loss of chain terminator, which is required for the actual reaction itself and for its viscosity control. Thus, the higher the proportion of di-chain terminator in the polycarbonate, the higher the amount of chain terminator required, which is economically and environmentally less advantageous and makes viscosity control in the process more difficult. It is therefore desirable to keep the content of di-chain terminator carbonate as low as possible.

Di-chain terminator carbonate is formed through the reaction of phosgene with the chain terminator. It is therefore customary to add the chain terminator to the reaction system only once the phosgene has reacted completely. This can be achieved for example by employing a multistage process comprising a first stage of initially producing an oligomer that in a second stage undergoes further condensation, or by adding the chain terminator very late in the process at high conversions, i.e. once the molecular weight attained by the polycarbonate is already high. However, according to conventional theory the oligomer content in the resulting polycarbonate is increased when the chain terminator is not added until high conversions have been attained. It has been reported that a high proportion of oligomers leads to brittleness in low-molecular-weight PC, can result in molecular weight degradation as a result of transesterification during extrusion, and reduces impact strength. In the prior art the process is therefore normally performed so as to strike a compromise between a high content of oligomers and a low content of di-chain terminator carbonate or else a low content of oligomers and a high content of di-chain terminator carbonate in the polycarbonate.

EP 0 408 924 A2 describes the production of low-molecular-weight polycarbonate having a narrow molecular weight distribution, i.e. a low oligomer proportion. In order to achieve such a narrow distribution, this prior art proposes a two-stage process in which a phosgene-free bischloroformate having a degree of polymerization of 0 to 6 is capped for example with phenol, after which the resulting capped bischloroformate undergoes condensation with addition of a catalyst and a base. Here too, phenol is added to the bischloroformate solution as a chain terminator at a point at which there is no longer any phosgene present in the solution. EP 0 289 826 A2 likewise relates to the production of polycarbonate having a low proportion of oligomers. This likewise starts from a bischloroformate having a degree of polymerization of 0 to 6. According to example 2, this bischloroformate is produced in a reaction initially employing a large excess of phosgene (739.3 mmol of phosgene to 250 mmol of bisphenol A). The unreacted proportion of the phosgene is therefore subsequently decomposed by addition of NaOH. Only then is the chain terminator p-t-butylphenol added. This means that here too the chain terminator is added to the reaction system at a point at which there is no longer any phosgene present.

EP 0 640 639 A2 describes a two-stage process in which bisphenol A initially undergoes a continuous reaction with an excess of phosgene. This is followed in a further step by separation of the organic and aqueous phase, with further bisphenol A and NaOH subsequently added to the organic phase to ensure any remaining phosgene has reacted. Only then is a catalyst and the chain terminator added.

In all the cases described above, an excess of phosgene is initially used, which is subsequently again destroyed. Not only is this uneconomical because not all of the phosgene is utilized for the actual reaction, it is also unsustainable from an environmental viewpoint, since a previously manufactured product is being destroyed "unused". In addition, the described processes require production of a new solution after production of the bischloroformate, which is associated with corresponding costs. This especially has the result that the described processes cannot readily be performed as a continuous process. This would require additional apparatus that is also resistant to corrosion, having additional residence times with a highly corrosive material.

EP 2 098 553 A2 describes how the phosgene excess can be reduced in an interfacial process for the production of polycarbonate. However, this prior art does not say anything about the formation of oligomers and di-chain terminator carbonate. Nor is it described here whether or not phosgene is still present in the reaction mixture at the time of addition of the chain terminator. Similar conclusions can also be drawn from WO 2015/110447 A1. Both of the described processes optimize the phosgene excess, but without any focus on optimizing the product properties through a good molecular weight distribution.

SUMMARY

It is accordingly an object of the present invention to provide a process for producing polycarbonate by the interfacial process in which at least one disadvantage of the prior art is improved. A particular object of the present invention was to provide a process for producing polycarbonate by the interfacial process in which the phosgene excess may be reduced. It was in addition preferably at the same time desirable to obtain a polycarbonate having a low oligomer proportion and thus a narrow molecular weight distribution. It was likewise preferably at the same time desirable for the process to provide a polycarbonate having a low content of di-chain terminator carbonate. A particular object of the present invention was to provide a process for producing polycarbonate by the interfacial process that affords a polycarbonate having both a low proportion of oligomers and a low proportion of di-chain terminator carbonate.

At least one, preferably all, of the abovementioned objects were achieved by the present invention. It was surprisingly found that the addition of the chain terminator to the reaction system may also be carried out at a point at which phosgene is still present in the reaction system. However, this is possible only when the chain terminator is introduced into the reaction system at a very early point. "Very early" is here understood as meaning that only oligomeric compounds from the reaction of at least one dihydroxydiarylalkane with the phosgene are present which on average have a degree of polymerization of at least one unit and at most five six units. The resulting polycarbonate surprisingly has a low proportion of di-chain terminator carbonate, even though the chain terminator is introduced into a system containing phosgene. At the same time, the resulting polycarbonate has a narrow molecular weight distribution and thus a low oligomer proportion. The resulting polycarbonate therefore also has the above-described improved properties resulting from a low proportion of di-chain terminator carbonate and a low proportion of oligomers. The process according to the invention is thus more economical and more environmentally friendly than the processes described in the prior art. Not only can the phosgene excess be reduced with the process according to the invention, but the amount of chain terminator required can be reduced since losses through the formation of di-chain terminator carbonate are lower.

BRIEF DESCRIPTION OF DRAWINGS

Information for FIG. 1:

Unbroken line: Original GPC, normalized to area=1

Dotted line: Schulz-Flory distribution adjusted so the maximum coincides with the maximum of the GPC Dashed line: Difference between the two curves (unbroken and dotted line)

The oligomer fraction is obtained from the integral of the difference curve between 500-5000 g/mol.

DETAILED DESCRIPTION

The present invention therefore provides a process for producing polycarbonate by the interfacial process from at least one dihydroxydiarylalkane, phosgene, at least one catalyst, and at least one chain terminator, which is characterized in that (i) the at least one chain terminator is introduced into the reaction system comprising at least the at least one dihydroxydiarylalkane, phosgene, and the reaction product R of the at least one dihydroxydiarylalkane and phosgene at a point at which the reaction product R is a mixture of compounds and these compounds on average have a degree of polymerization of at least one unit and at most five six units formed from the at least one dihydroxydiarylalkane by the reaction with the phosgene.

According to the invention, at the time of addition of the at least one chain terminator the reaction system comprises at least the at least one dihydroxydiarylalkane, phosgene, and the reaction product R. The system may at this point also comprise at least one catalyst. This is however not preferred. At the time of addition of the at least one chain terminator, the reaction system preferably comprises, very particularly preferably consists of, at least one dihydroxydiarylalkane, phosgene, the reaction product R, and the solvents necessary for performing the interfacial process. Said solvents are preferably an aqueous alkali metal hydroxide solution and at least one organic solvent.

As already described above, the chain terminator is according to the invention introduced into the reaction system "early". This point is according to the invention defined as being when the reaction product R is a mixture of compounds in which said compounds on average have a degree of polymerization of at least one unit and at most six units.

The term "degree of polymerization" is known to those skilled in the art. The degree of polymerization preferably indicates the number of units in the oligomeric reaction product R formed from the at least one dihydroxydiarylalkane by the reaction with the phosgene. The stated degree of polymerization is an average value. This is because the degree of polymerization is preferably determined on the basis of the number-average molar mass $M_n$. This is calculated as the ratio of $M_n$ of the oligomer/polymer and the molar mass of the repeat unit (the unit formed from the at least one dihydroxydiarylalkane by the reaction with the phosgene; preferably the unit represented by the general chemical formula (I)). The number-average molar mass $M_n$ in turn is according to the invention preferably determined by gel-permeation chromatography (GPC). It is particularly preferably determined by GPC in accordance with DIN 55672-1:2016-03, calibrated against bisphenol A polycarbonate standards with dichloromethane as eluent. It is according to the invention very particularly preferable when the molecular weights Mw (weight average), Mn (number average), and Mv (viscosity average) are determined by gel-permeation chromatography based on DIN 55672-1: 2007-08 using a BPA polycarbonate calibration. Calibration was carried out using linear polycarbonates of known molar mass distribution (for example from PSS Polymer Standards Service GmbH, Germany). Method 2301-0257502-09D (2009 German language version) of Currenta GmbH & Co. OHG, Leverkusen was used. Dichloromethane was used as eluent. The column combination consisted of crosslinked styrene-divinylbenzene resins. The GPC may comprise one or more serially connected commercially available GPC columns for size-exclusion chromatography, selected such that sufficient separation of the molar masses of polymers, in particular of aromatic polycarbonates having weight-average molar masses Mw of 2000 to 100 000 g/mol, is possible. The analytical columns typically have a diameter of 7.5 mm and a length of 300 mm. The particle sizes of the column material are within a range from 3 μm to 20 μm. The concentration of the analyzed solutions was 0.2% by weight. The flow rate was adjusted to 1.0 ml/min, the temperature of the solution was 30° C. Detection was by means of a refractive index (RI) detector.

The process according to the invention is preferably characterized in that the compounds of the mixture of the reaction product R are represented by the general chemical formula (I):

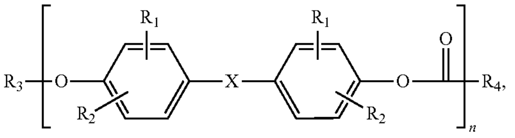

(I)

in which

- $R_1$ and $R_2$ independently represent H, C1 to C18 alkyl, C1 to C18 alkoxy, halogen such as Cl or Br or in each case optionally substituted aryl or aralkyl, preferably H or C1 to C12 alkyl, particularly preferably H or C1 to C8 alkyl, and very particularly preferably H or methyl,
- $R_3$ represents H, (C═O)—Cl or (C═O)—OH,
- $R_4$ represents OH or Cl,
- X represents a single bond, —$SO_2$—, —CO—, —O—, —S—, C1 to C6 alkylene, C2 to C5 alkylidene or C5 to C6 cycloalkylidene, which may be substituted by C1 to C6 alkyl, preferably methyl or ethyl, or else represents C6 to C12 arylene, which may optionally be fused to further aromatic rings containing heteroatoms, and
- n represents the degree of polymerization and thus the number of units formed from the at least one dihydroxydiarylalkane by the reaction with the phosgene and on average may have a value of 1 to 6, preferably 1 to 5, particularly preferably 1 to 4, very particularly preferably 1 to 3.

It is according to the invention likewise possible that the reaction product R in addition may be in at least partly hydrolyzed form. The chlorine of the chloroformate group is cleaved off, with the formation of carbonate. However, this side reaction is according to the invention undesirable. What this means is that the reaction product R is a mixture that includes a hydrolysis product of this kind. However, this is less preferred. The compounds of the mixture of the reaction product R are preferably represented by the general chemical formula (I), in which

- $R_1$ and $R_2$ each independently represent H or C1 to C12 alkyl, particularly preferably H or C1 to C8 alkyl, and very particularly preferably H or methyl,
- $R_3$ represents H or (C═O)—Cl,
- $R_4$R4 represents Cl,
- X represents a single bond, C1 to C6 alkylene, C2 to C5 alkylidene or C5 to C6 cycloalkylidene, which may be substituted by methyl or ethyl, and
- n represents the degree of polymerization and thus the number of units formed from the at least one dihydroxydiarylalkane by the reaction with the phosgene and on average may have a value of 1 to 6, preferably 1 to 5, particularly preferably 1 to 4, very particularly preferably 1 to 3.

The compounds of the mixture of the reaction product R are very particularly preferably represented by the general chemical formula (I), in which

- $R_1$ and $R_2$ each independently represent H or methyl,
- $R_3$ represents H or (C═O)—Cl,
- $R_4$ represents OH,
- X represents isopropylidene or 3,3,5-trimethylcyclohexylidene, and
- n represents the degree of polymerization and thus the number of units formed from the at least one dihydroxydiarylalkane by the reaction with the phosgene and on average may have a value of 1 to 6, preferably 1 to 5, particularly preferably 1 to 4, very particularly preferably 1 to 3.

Use of bisphenol A as the dihydroxydiarylalkane in the process according to the invention preferably results in average molar masses Mn (number average) within a range from 352 g/mol (a BPA having two chlorocarbonic ester end groups) to 1623 g/mol (n=on average 6), depending on the nature of end group $R_3$ and/or $R_4$ (OH or Cl) in the general chemical formula (I). It is here particularly preferable when the molar mass is below 1000 g/mol.

It has proven advantageous when the at least one chain terminator is initially well mixed before it can react. The at least one chain terminator is preferably homogeneously distributed. This may be achieved for example by using a static mixer after addition of the at least one chain terminator before said terminator reacts.

It has also proven advantageous when the at least one chain terminator is supplied to the reaction system as an organic phase and not as an aqueous phase.

It is preferable when the process according to the invention is characterized in that the process comprises the step of at least one addition of an aqueous alkali metal hydroxide solution. The term "addition" is preferably understood as meaning an active step of the additional addition. It may especially also be possible to initially dissolve the at least one dihydroxyarylalkane in an aqueous alkali metal hydroxide solution before it is supplied to the reaction system. Such an initial step is according to the invention preferably not the addition of an aqueous alkali metal hydroxide solution. However, it is further preferable when, after this initial step of dissolving the at least one dihydroxyarylalkane, any addition of an aqueous alkali metal hydroxide solution (whether with the at least one dihydroxyarylalkane or not) is understood as constituting an addition of an aqueous alkali metal hydroxide solution.

It has been found to be particularly advantageous when the process according to the invention is characterized (ii) in that the addition of the at least one chain terminator to the reaction system in process step (i) takes place prior to the first of the one or more additions of the aqueous alkali metal hydroxide solution.

It is initially clear to those skilled in the art that aqueous alkali metal hydroxide solution can certainly in principle be added before addition of the at least one chain extender. However, it has in accordance with the invention been found that this amount must not be too high, since otherwise the degree of polymerization of the reaction product R becomes too high. This means that, before addition of the at least one chain terminator, those skilled in the art can add aqueous alkali metal hydroxide solution only in an amount that still ensures that the restrictions on the reaction product R according to the invention are complied with.

However, it has been proven advantageous when the at least one chain terminator is added at a pH of 8-11, preferably 9-10. It has been found that at higher pH values (>11) the distribution of the at least one chain terminator between the organic and aqueous phase becomes disadvantageous. In this situation a large proportion is found in the aqueous phase, where it is unable to react with the chloroformate end groups. It is therefore according to the invention preferable when the process according to the invention includes no addition of an aqueous alkali metal hydroxide solution before addition of the at least one chain terminator. This is especially the case when the at least one chain terminator comprises phenol. For this reason it is advantageous to add the aqueous alkali hydroxide solution only after the addition of the at least one chain terminator.

The process according to the invention is preferably characterized in that the process comprises the following steps:

(a) generating a dispersion from an organic and an aqueous phase, wherein the organic phase comprises at least one solvent suitable for the polycarbonate and at least a portion of the phosgene and the aqueous phase comprises the at least one dihydroxydiarylalkane, water and 1.8 mol to 2.2 mol, preferably 1.95 mol to 2.05 mol, of aqueous alkali metal hydroxide solution per mol of dihydroxydiarylalkane, (b) generating the reaction system comprising at least the reaction product R from the at least one dihydroxydiarylalkane and phosgene in the dispersion obtained from step (a) through reaction of the at least one dihydroxydiarylalkane and the phosgene, (c) adding at least one chain terminator to the reaction system of step (b), unreacted phosgene still being present in the reaction system of step (b), and (d) optionally performing at least one addition of alkali metal hydroxide solution to the mixture obtained from step (c).

The dispersion of the two phases (aqueous and organic phase) in step (a) can preferably be achieved by built-in pipe baffles, static mixers, dispersers and/or, for example, pumps. The reaction is preferably carried out in a plug flow with little backmixing. This can thus be done for example in tubular reactors. As already described above, the presence of an aqueous alkali metal hydroxide solution in step (a) is according to the invention preferably not understood as meaning addition of an aqueous alkali metal hydroxide solution. This is the aqueous alkali metal hydroxide solution, preferably aqueous sodium hydroxide solution, used to dissolve the BPA in the aqueous phase. During the phosgenation step (a) it is preferable that the available amount of free aqueous alkali metal hydroxide solution is as low as possible, so as to avoid hydrolysis of the phosgene to sodium carbonate (i.e. loss of phosgene). Step (a) of the invention accordingly employs 1.80 mol to 2.20 mol, preferably 1.95 mol to 2.05 mol, of aqueous alkali metal hydroxide solution per mol of dihydroxydiarylalkane.

Dispersion of the organic phase in the aqueous phase or of the aqueous phase in the organic phase, preferably using a disperser, may produce an oil-in-water (ow) dispersion or a water-in-oil (wo) dispersion, oil being understood as meaning the organic phase. Dispersion preferably generates a water-in-oil dispersion. The organic phase is preferably continuously dispersed into the aqueous phase using the disperser.

An oil-in-water dispersion is by definition one in which water forms the external (continuous) phase and oil forms the internal (dispersed) phase, i.e. oil droplets are dispersed in water. A water-in-oil dispersion is accordingly one in which oil forms the external phase and water the internal phase.

The organic phase comprises one or more solvents.

Suitable solvents are aromatic and/or aliphatic chlorinated hydrocarbons, preferably dichloromethane, trichloroethylene, 1,1,1-trichloroethane, 1,1,2-trichloroethane, and chlorobenzene and mixtures thereof. However, it is also possible to use aromatic hydrocarbons such as benzene, toluene, m-/p-/o-xylene or aromatic ethers such as anisole alone, in admixture, or in addition to or in admixture with chlorinated hydrocarbons; preference is given to dichloromethane and chlorobenzene and mixtures thereof. Another embodiment of the process according to the invention employs solvents that do not dissolve, but merely swell, the polycarbonate. It is therefore also possible to use non-solvents for polycarbonate in combination with solvents. Solvents that are also soluble in the aqueous phase, such as tetrahydrofuran, 1,3- or 1,4-dioxane or 1,3-dioxolane, can then be used as solvents when the solvent partner forms the second organic phase.

Suitable dihydroxydiarylalkanes—hereinabove and hereinbelow also referred to inter alia as diphenol—are those of the general formula

HO—Z—OH in which Z is a divalent organic radical having 6 to 30 carbon atoms that contains one or more aromatic groups. Examples of such compounds employable in the process according to the invention are dihydroxydiarylalkanes such as hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl) ethers, bis (hydroxyphenyl) ketones, bis(hydroxyphenyl) sulfones, bis (hydroxyphenyl) sulfoxides, 4,4'-bis(hydroxyphenyl) diisopropylbenzenes, and alkylated, ring-alkylated, and ring-halogenated compounds thereof.

Preferred dihydroxydiarylalkanes are 4,4'-dihydroxydiphenyl, 2,2-bis(4-hydroxyphenyl)-1-phenylpropane, 1,1-bis (4-hydroxyphenyl)phenylethane, 2,2-bis(4-hydroxyphenyl) propane (bisphenol A (BPA)), 2,4-bis(4-hydroxyphenyl)-2-methylbutane, 1,3-bis[2-(4-hydroxyphenyl)-2-propyl] benzene (bisphenol M), 2,2-bis(3-methyl-4-hydroxyphenyl) propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene, 1,1-bis(4-hydroxyphenyl)cyclohexane, and 1,1-bis(4-hydroxyphenyl)-3,3,5-trimethylcyclohexane (bisphenol TMC).

Particularly preferred dihydroxydiarylalkanes are 4,4'-dihydroxydiphenyl, 1,1-bis(4-hydroxyphenyl)phenylethane, 2,2-bis(4-hydroxyphenyl)propane (bisphenol A (BPA)), 2,2-bis(3,5-dimethyl-4-hydroxyphenyl)propane, 1,1-bis(4-hydroxyphenyl)cyclohexane, and 1,1-bis(4-hydroxyphenyl)-3,3,5-trimethylcyclohexane (bisphenol TMC).

These and further suitable dihydroxydiarylalkanes are described for example in U.S. Pat. Nos. 2,999,835, 3,148,172, 2,991,273, 3,271,367, 4,982,014, and 2,999,846, in German published specifications DE-A 1 570 703, DE-A 2 063 050, DE-A 2 036 052, DE-A 2 211 956, and DE-A 3 832

396, in French patent FR-A 1 561 518, in the monograph by H. Schnell, Chemistry and Physics of Polycarbonates, Interscience Publishers, New York 1964, p. 28 ff.; p. 102 ff. and by D. G. Legrand, J. T. Bendler, Handbook of Polycarbonate Science and Technology, Marcel Dekker New York 2000, p. 72 ff.

Polycarbonates are according to the invention understood as meaning both homopolycarbonates and copolycarbonates. In the case of production according to the invention of homopolycarbonates, only one dihydroxydiarylalkane is employed, and in the case of production according to the invention of copolycarbonates, two or more dihydroxydiarylalkanes are employed, it being self-evident that the employed dihydroxydiarylalkanes, as well as all other chemicals and auxiliaries added to the synthesis, may be contaminated with impurities deriving from their own synthesis, handling, and storage, although it is desirable to employ the purest possible raw materials.

Aqueous alkali metal hydroxide solution is in the context of the invention preferably to be understood as meaning aqueous sodium hydroxide solution, aqueous potassium hydroxide solution or mixtures thereof, particularly preferably aqueous sodium hydroxide solution.

The aqueous phase in the interfacial process for producing the polycarbonate comprises aqueous alkali metal hydroxide solution, one or more dihydroxydiarylalkanes, and water, wherein the total dihydroxydiarylalkane concentration of this aqueous solution, calculated as the free dihydroxydiarylalkanes rather than as the alkali metal salts, is preferably between 1% and 30% by weight, particularly preferably between 3% and 25% by weight, very particularly preferably 15% to 18% by weight, based on the total weight of the aqueous phase. The alkali metal hydroxide used to dissolve the dihydroxydiarylalkanes, for example sodium or potassium hydroxide, may be used in solid form or as the corresponding aqueous alkali metal hydroxide solution. The concentration of the aqueous alkali metal hydroxide solution is determined by the target concentration of the desired dihydroxydiarylalkane solution, but is usually between 5% and 25% by weight, preferably 5% and 10% by weight, based on 100% by weight of aqueous alkali metal hydroxide solution, or a more concentrated solution that is subsequently diluted with water is chosen. The process with subsequent dilution uses aqueous alkali metal hydroxide solutions having concentrations between 15% and 75% by weight, preferably 25% and 55% by weight, which are optionally thermally equilibrated. The alkali content per mol of dihydroxydiarylalkane depends on the structure of the dihydroxydiarylalkane but is usually from 1.5 mol alkali/mol dihydroxydiarylalkane to 2.5 mol alkali/mol dihydroxydiarylalkane, preferably from 1.8 to 2.2 mol alkali/mol dihydroxydiarylalkane, and—in a particularly preferred case where bisphenol A is used as the sole dihydroxydiarylalkane—from 1.85 to 2.5 mol of alkali, very particularly preferably 2.00 mol of alkali. If more than one dihydroxydiarylalkane is used, these may be dissolved together. However, since the solubility of dihydroxydiarylalkanes depends very strongly on the amount of alkali used, instead of one solution comprising two dihydroxydiarylalkanes it may be advantageous to have two solutions each comprising one dihydroxydiarylalkane dissolved in a suitable aqueous alkali metal hydroxide solution, which are then metered in separately so as to give rise to the correct mixing ratio. It may moreover be advantageous to dissolve the dihydroxydiarylalkane(s) not in aqueous alkali metal hydroxide solution, but in dilute dihydroxydiarylalkane solution containing additional alkali. The dissolution processes may proceed from solid dihydroxydiarylalkanes, usually in flake or prill form, or else from molten dihydroxydiarylalkanes. The alkali metal hydroxide or aqueous alkali metal hydroxide solution used may in the case of sodium hydroxide/aqueous sodium hydroxide solution have been produced for example by the amalgam process or the so-called membrane process. Both methods have long been used and are familiar to those skilled in the art. When aqueous sodium hydroxide solution is used, it is preferable that this was produced by the membrane process.

In such an aqueous solution and/or the aqueous phase, the dihydroxydiarylalkane(s) are completely or partly in the form of the corresponding alkali metal salts/dialkali metal salts.

Optionally practised metered addition of dihydroxydiarylalkane(s) after or during the introduction of phosgene can be carried out for as long as phosgene or the chlorocarbonic esters directly formed therefrom are present in the reaction solution.

The organic phase of step (a) comprises alongside the at least one solvent additionally at least phosgene. The organic phase here already contains all or part of the phosgene required before production of the mixture. Before production of the mixture, it is preferable that the organic phase contains the total amount of phosgene required, including the phosgene excess used. The phosgene can be introduced into the organic phase in gaseous or liquid form. It is preferable when the reaction system at the beginning of the reaction contains an excess of phosgene relative to the sum of the employed dihydroxydiarylalkanes of 3 to 20 mol %, particularly preferably 5 to 18 mol %, and very particularly preferably 7.5 to 15.0 mol %.

The addition of at least one chain terminator to the reaction system of step (b) takes place in step (c). The reaction system of step (b) still contains unreacted phosgene. The at least one chain terminator is usually monofunctional. The at least one chain terminator is preferably selected from the group consisting of phenol, alkylphenols, and chlorocarbonic esters thereof or acid chlorides of monocarboxylic acids, preferably from phenol, tert-butylphenol and isooctylphenol, cumylphenol. Any desired mixtures of the recited chain terminators may be used.

In a particularly preferred embodiment of the process according to the invention, phenol is used as the chain terminator. It is preferable to use the phenol in step (c) in the form of a solution comprising at least one organic solvent and the phenol in a concentration of 5% to 40% by weight, preferably 10% to 25% by weight. In this embodiment, the aqueous phase is at the end of the reaction (i.e. in step c)) preferably adjusted to a pH of 11.3 to 11.6. The addition of the phenol and the adjustment of the pH to 11.3 to 11.6 preferably takes place before addition of the catalyst.

In another preferred embodiment of the process according to the invention, p-tert-butylphenol is used as the chain terminator. It is preferable to use the p-tert-butylphenol in step (c) in the form of a solution comprising at least one organic solvent and the p-tert-butylphenol in a concentration of 2% to 25% by weight, preferably 3% to 15% by weight. In this embodiment, the aqueous phase is at the end of the reaction (i.e. in step c)) preferably adjusted to a pH of 11.5 to 11.8. The addition of the p-tert-butylphenol and the adjustment of the pH to 11.5 to 11.8 preferably take place before addition of the catalyst.

In step (c) one or more branching agents or branching mixtures may optionally be added to the synthesis. However, such branching agents are preferably added before the chain terminator(s). Such branching agents are very particularly preferably added in process step (a) with the aqueous phase together with the solution of the at least one dihydroxydiarylalkane. Examples of branching agents used include trisphenols, quaterphenols, acid chlorides of tri- or tetracarboxylic acids or else mixtures of polyphenols or of acid chlorides.

Examples of compounds suitable as branching agents having three, or more than three, phenolic hydroxyl groups are phloroglucinol, 4,6-dimethyl-2,4,6-tri(4-hydroxyphenyl)hept-2-ene, 4,6-dimethyl-2,4,6-tri(4-hydroxyphenyl) heptane, 1,3,5-tri(4-hydroxyphenyl)benzene, 1,1,1-tri(4-hydroxyphenyl)ethane, tri(4-hydroxyphenyl)phenylmethane, 2,2-bis[4,4-bis(4-hydroxyphenyl)cyclohexyl]propane 2,4-bis(4-hydroxyphenyl-isopropyl)phenol, tetra(4-hydroxyphenyl)methane.

Examples of other trifunctional compounds suitable as branching agents include 2,4-dihydroxybenzoic acid, trimesic acid, cyanuric chloride, and 3,3-bis(3-methyl-4-hydroxyphenyl)-2-oxo-2,3-dihydroindole. Particularly preferred branching agents are 3,3-bis(3-methyl-4-hydroxyphenyl)-2-oxo-2,3-dihydroindole and 1,1,1-tri(4-hydroxyphenyl)ethane.

The at least one addition of aqueous alkali metal hydroxide solution to the mixture obtained from step (c) takes place in the optional step (d). The process according to the invention preferably comprises this step (d). This step is an exothermic reaction. It is according to the invention preferably carried out within a temperature range of −5° C. to 100° C., particularly preferably 15° C. to 80° C., very particularly preferably 25° C. to 65° C., and may need to be performed under positive pressure, depending on the solvent or solvent mixture. Different pressures may be employed depending on the reactor used. For example, a pressure of 0.5 to 20 bar (absolute) may preferably be employed.

It has proven advantageous when the at least one addition of the aqueous alkali metal hydroxide solution takes place when the dispersion is still an oil-in-water dispersion. The addition of alkali metal hydroxide solution, which is aqueous, to a water-in-oil emulsion generally results in a non-ideal molecular weight distribution. Since the at least one chain terminator is preferably added beforehand, this also means that the at least one chain terminator is preferably also added to an oil-in-water dispersion. It is according to the invention possible for the dispersion to switch from water-in-oil to an oil-in-water dispersion during the process.

In addition, the process according to the invention optionally comprises the step of (e) performing at least one addition of at least one catalyst.

The process according to the invention preferably comprises this step. The process according to the invention preferably includes step (e) after step (d).

It is preferable when the at least one catalyst is selected from the group consisting of a tertiary amine, an organophosphine, and any desired mixtures. The at least one catalyst is very particularly preferably a tertiary amine or a mixture of at least two tertiary amines. Tertiary amines are likewise preferably triethylamine, tributylamine, trioctylamine, N-ethylpiperidine, N-methylpiperidine or N-isopropyl-/N-n-propylpiperidine; these compounds are described in the literature as typical interfacial catalysts, are commercially available, and are well known to those skilled in the art. The catalysts may be added to the synthesis individually, in admixture or else simultaneously or successively, optionally also before the phosgenation, although metered additions after phosgene introduction are preferred. The metered addition of the catalyst(s) may be carried out as the pure substance, in an inert solvent—preferably the solvent or one of the solvents of the organic phase in the polycarbonate synthesis—or else as an aqueous solution. When using tertiary amines as catalyst, the metered addition thereof may for example take place in aqueous solution in the form of their ammonium salts with acids, preferably mineral acids, in particular hydrochloric acid. When using two or more catalysts or when performing metered addition of part-amounts of the total amount of catalyst, it is of course possible to employ different modes of metered addition at different locations or at different times. The total amount of the employed catalysts is preferably between 0.001 to 10 mol %, preferably 0.01 to 8 mol %, particularly preferably 0.05 to 5 mol %, based on moles of dihydroxydiarylalkanes used.

The process according to the invention is preferably characterized in that the process is operated continuously. As already explained above, the advantage of the invention is particularly great in continuous processes.

The overall reaction, i.e. reaction and further condensation, may therefore take place in stirred-tank reactors, tubular reactors, pumped-circulation reactors or stirred-tank reactor cascades or combinations thereof, wherein the use of the abovementioned mixing apparatuses ensures that the aqueous and organic phase ideally undergo demixing only when the synthesis mixture has fully reacted, i.e. no hydrolyzable chlorine or phosgene or chlorocarbonic esters remain present.

Despite the low excess of phosgene, the process according to the invention enables good phase separation at the end of the reaction and both a low water content in the organic phase and a low residual monomer content in the aqueous phase. Incorporation of catalyst components into the product is also avoided.

For workup, the reacted at least biphasic reaction mixture containing at most traces, preferably less than 2 ppm, of chlorocarbonic esters is left to settle for phase separation. The aqueous alkaline phase is optionally completely or partly recycled to the polycarbonate synthesis as aqueous phase or else passed to the wastewater workup where solvent and catalyst fractions are separated and optionally recycled to the polycarbonate synthesis. In another workup variant, separation of the organic impurities, in particular solvents and polymer residues, and optional adjustment to a particular pH, for example by addition of aqueous sodium hydroxide solution, is followed by separation of the salt, which may be sent e.g. for chlor-alkali electrolysis, whereas the aqueous phase is optionally recycled to the polycarbonate synthesis.

The organic phase containing the polycarbonate can then be purified in various ways known to those skilled in the art, to remove alkali metal, ionic or catalytic contaminants.

Even after one or more settling processes, optionally assisted by passage through settling tanks, stirred-tank reactors, coalescers or separators and/or combinations of these measures—wherein water may optionally be added in each or in some separation steps in some cases using active or passive mixing apparatuses—the organic phase generally still contains proportions of the aqueous alkaline phase in fine droplet form as well as proportions of the catalyst(s). After this coarse separation of the alkaline aqueous phase, the organic phase may be washed one or more times with dilute acids, mineral acids, carboxylic acids, hydroxycarboxylic acids, and/or sulfonic acids. Preference is given to aqueous mineral acids, in particular hydrochloric acid, phosphorous acid, phosphoric acid or mixtures of these acids. The concentration of these acids should preferably be within a range of 0.001% to 50% by weight, preferably 0.01% to 5% by weight. The organic phase may additionally undergo repeated washing with demineralized or distilled water. The separation of the organic phase optionally dispersed with portions of the aqueous phase after the individual washing steps is carried out using settling tanks, stirred-tank reactors, coalescers or separators or combinations of these measures, wherein the metered addition of the washing water between the washing steps may optionally be carried out using active or passive mixing apparatuses. Between these washing steps or else after washing, there may be an optional addition of acids, preferably dissolved in the solvent used in the polymer solution. Preference here is given to using hydrogen chloride gas, phosphoric acid or phosphorous acid, which may optionally also be employed as mixtures. After the final separating operation, the resulting purified polycarbonate solution should preferably contain not more than 5% by weight, preferably less than 1% by weight, very particularly preferably less than 0.5% by weight, of water.

Isolation of the polycarbonate from the solution can be effected by evaporation of the solvent by means of temperature, vacuum or a heated entraining gas. Other isolation methods include for example crystallization and precipitation.

When concentration of the polycarbonate solution and possibly also isolation of the polycarbonate are effected by distillative removal of the solvent, optionally by superheating and expansion, this is referred to as a "flash process". Such a process is known to those skilled in the art and is described for example in "Thermische Trennverfahren" [Thermal Separation Processes], VCH Verlagsanstalt 1988, p. 114. When a heated carrier gas together with the solution to be concentrated is instead sprayed, this is referred to as "spray evaporation/spray drying" and is described for example in Vauck, "Grundoperationen chemischer Verfahrenstechnik" [Basic operations of chemical engineering], Deutscher Verlag für Grundstoffindustrie 2000, 11th edition, p. 690. All of these processes are described in the patent literature and in textbooks and are familiar to those skilled in the art.

Removal of the solvent through temperature (distillative removal) or the technically more effective flash process affords highly concentrated polycarbonate melts. In the flash process, polymer solutions are repeatedly heated under a slight positive pressure to temperatures above the boiling point under atmospheric pressure and these solutions which are superheated in respect of atmospheric pressure are then decompressed into a vessel at lower pressure, for example atmospheric pressure. It may be advantageous not to allow the concentration stages, or in other words the temperature stages of the superheating, to become too substantial, but rather to opt for a two- to four-stage process.

The residues of the solvent can be removed from the resulting highly concentrated polycarbonate melts either directly from the melt by means of vented extruders (cf. for example BE-A 866 991, EP-A 0 411 510, U.S. Pat. No. 4,980,105, DE-A 33 32 065), thin-film evaporators (cf. for example EP-A 0 267 025), falling-film evaporators, strand evaporators, foam evaporators (for example US 2012/015763 A1) or by friction compaction (cf. for example EP-A 0 460 450), optionally also with addition of an entraining agent, such as nitrogen or carbon dioxide, or using vacuum (cf. for example EP-A 0 039 96, EP-A 0 256 003, U.S. Pat. No. 4,423,207), alternatively also by subsequent crystallization (cf. for example DE-A 34 29 960) and/or baking out the residues of the solvent in the solid phase (cf. for example U.S. Pat. No. 3,986,269, DE-A 20 53 876). These processes too and the apparatuses required therefor are described in the literature and are familiar to those skilled in the art.

Polycarbonate granulates are obtainable—where possible—by direct spinning of the melt and subsequent granulation or else by using melt extruders from which spinning is carried out in air or under liquid, usually water. When extruders are used, the polycarbonate melt may be admixed with additives upstream of the extruder, optionally using static mixers or via side extruders in said extruder.

The polycarbonate solution may alternatively be subjected to spray evaporation. During spraying, the optionally heated polycarbonate solution is either atomized into a vessel at reduced pressure or atomized with a heated carrier gas, for example nitrogen, argon or steam, into a vessel at atmospheric pressure via a nozzle. In both cases—depending on the concentration of the polymer solution—powders (dilute) or flakes (concentrated) of the polymer are obtained, from which it may also be necessary to remove the last residues of the solvent as above. Granulate may subsequently be obtained by means of a compounding extruder and subsequent spinning. Here too, additives as described hereinabove may be added in the peripheral equipment or to the extruder itself. It can often be necessary for the polymer powder to undergo a compacting step before extrusion as a consequence of the low bulk density of the powders and flakes.

The polymer may be largely precipitated from the washed and optionally further concentrated polycarbonate solution by addition of a non-solvent for polycarbonate. The non-solvents act here as precipitants. It is advantageous here to first add a small amount of the non-solvent and optionally also to allow wait times between additions of the portions of non-solvent. It may also be advantageous to use different non-solvents. Examples of precipitants used here include aliphatic or cycloaliphatic hydrocarbons, in particular heptane, isooctane or cyclohexane, alcohols, for example, methanol, ethanol or isopropanol, ketones, for example, acetone, or mixtures thereof. In the precipitation, the polymer solution is generally added to the precipitant slowly. The resulting polycarbonates are processed into granulate as described for spray evaporation and optionally additized.

In other processes, precipitation and crystallization products or amorphously solidified products are crystallized in finely divided form by treatment with vapors of one or more non-solvents for polycarbonate with simultaneous heating below the glass transition temperature and subjected to further condensation to higher molecular weights. When oligomers optionally having different terminal groups are concerned (phenolic and chain terminator ends), this is referred to as solid-phase condensation.

The addition of additives serves to extend service life or improve color stability (stabilizers), simplify processing (for example mold release agents, flow promoters, antistats) or to tailor polymer properties to particular demands (impact modifiers, such as rubbers; flame retardants, colorants, glass fibers).

These additives may be added to the polymer melt individually or in any desired mixtures, together or in a plurality of different mixtures. This may be done directly during the isolation of the polymer or else after melting granulate in a so-called compounding step. These additives or mixtures thereof may be added to the polymer melt in solid form, preferably as a powder, or as a melt. Another mode of metered addition is the use of masterbatches or mixtures of masterbatches of the additives or additive mixtures.

Examples of suitable additives are described in "Additives for Plastics Handbook, John Murphy, Elsevier, Oxford 1999" and in "Plastics Additives Handbook, Hans Zweifel, Hanser, Munich 2001".

The examples that follow are intended for exemplary elucidation of the invention and should not be seen as limiting.

EXAMPLES

The molecular weight distribution and the average values Mn (number-average) and Mw (weight-average) were determined by gel-permeation chromatography (GPC). Instrument: Waters "Mixed Bed" columns, measurement in methylene chloride as eluent (using BPA homopolycarbonate standard having an Mw of 31 000 g/mol).

In addition to the standing evaluation, the deviation of the GPC from an ideal Schulz-Flory distribution was also determined. This was done by first normalizing the GPC to obtain the area under the unbroken line in the diagram shown in FIG. 1. This area was normalized to 1. In addition, a Schulz-Flory (SF) distribution was adjusted so that maximum height and molecular weight both corresponded to that of the measured distribution (dotted line in FIG. 1). The difference between the measured and adjusted SF distribution gives the difference distribution (dashed line in FIG. 1). In the present cases the Schulz-Flory distribution is narrower, which means that the difference distribution is positive (with the exception of measurement inaccuracies). At the maximum, the difference as a consequence of the method is zero, with the result that the difference distribution breaks down into a low-molecular-weight section and a high-molecular weight section (see also FIG. 1).

It is known from the prior art that a high oligomer proportion is disadvantageous for product quality. However, it is generally only the total proportion of low-molecular-weight compounds below a certain threshold that is considered here or the proportion soluble in acetone. This has the disadvantage of also registering the unavoidable oligomer proportion, which moreover changes with polycarbonate type (viscosity, Mn). The method of the present invention corrects this dependence and determines only the process-specific oligomer fraction.

In the following, 2,2'-bis(4-hydroxyphenyl)propane (bisphenol A, BPA) was used as the dihydroxydiarylalkane and the solvent of the organic phase was a mixture of about 50% by weight methylene chloride and 50% by weight monochlorobenzene. All examples produced a polycarbonate having the stated weight-average molecular weight measured by GPC (Waters "mixed bed" columns in methylene chloride with BPA homopolycarbonate standard having an Mw of 31 000 g/mol).

Example 1: Difference in Addition Time of the Chain Terminator

The continuous laboratory tests were performed in a combination of pumps and stirred reactors. In all experiments 70.1 g/h of gaseous phosgene was dissolved in a T-piece in 772 g/h of organic solvent (1:1 methylene chloride/chlorobenzene) at −7° C. The amount of solvent required to ultimately obtain a 15% by weight polycarbonate solution was calculated. The continuously supplied phosgene solution was contacted in a further T-piece with 912 g/h of a 15% by weight aqueous alkaline BPA solution (2 mol of NaOH per mol of BPA), which had been preheated to 30° C. This BPA solution was dispersed in the phosgene solution through a stainless steel filter (pore size 60 μm).

The reaction mixture was passed into a Fink HMR040 mixing pump that was thermally equilibrated at 25° C., with the result that at the end of the reaction pump phosgene had reacted to the greatest possible extent but was still present. Downstream of this pump in examples 1a, 1c, and 1d, 3.29 g/h of p-tert-butylphenol was added as chain terminator in the form of a 3% by weight solution in the same solvent mixture as added above, and in a further HMR040 pump at 25° C. this reaction mixture was further reacted with 53.95 g/h of a 32% by weight aqueous sodium hydroxide solution, this resulting in a pH at the end of the reaction system of about 11.5. In comparative example 1b, the 3.29 g/h of p-tert-butylphenol as chain terminator was added in the form of a 3% by weight solution in the same solvent mixture as above. This was followed in each case by 2 stirred-tank reactors, each having a gear pump from Ismatec. The metered addition of 0.679 g/h of the catalyst (10% by weight of N-ethylpiperidine dissolved in chlorobenzene) in a T-piece in the Teflon hose was carried out between the two stirred tanks (and gear pumps).

Altogether 156 g of polycarbonate in organic solution was continuously obtained and, together with the aqueous phase from the reaction, passed into a phase-separation vessel for phase separation. The polycarbonate solution was washed with 10% by weight HCl and dried at standard pressure and room temperature.

Table 1 summarizes the results obtained in example 1:

TABLE 1

| | Phosgene excess % | Mn 0 g/mol | App. T ° C. | Diff. in MWD (PC) area % | Di-chain terminator carbonate (PC) ppm | CO3 % by weight | Mn (PC) g/mol | Mw (PC) g/mol |
|---|---|---|---|---|---|---|---|---|
| Example 1a | 16.2 | 750 | 35 | 2.72 | <50 | 0.65 | 10 580 | 26 980 |
| Comparative example 1b | 16.2 | 3470 | 35 | 8.10 | <50 | 0.65 | 7870 | 26 160 |
| Example 1c | 9.5 | 660 | 25 | 2.78 | <50 | 0.38 | 9800 | 26 200 |
| Example 1d | 7 | 730 | 25 | 2.50 | <50 | 0.33 | 9990 | 25 300 |

Mn0: Molecular weight at addition of chain terminator
Diff. in MWD (PC): Difference distribution; see above Example 1a shows the addition of the chain terminator at a point at which the reaction product R comprises a mixture of compounds having an average molar mass Mn 0 of 750 g/mol. In comparative example 1b, the chain terminator was added at a point at which the reaction product R comprises a mixture of compounds having an average molar mass MnO of 3470 g/mol. In examples 1c and 1d of the invention, the phosgene excess was reduced and the chain terminator added at a point at which the reaction product R comprises a mixture of compounds having an average molar mass MnO of respectively 660 and 730 g/mol. It can be seen that the resulting polycarbonate in all cases contains a low proportion of di-chain terminator carbonate. However, the polycarbonates in the examples of the invention also have a significantly lower value for oligomers (measured through diff. in MWD).

In comparative example 1b, the NaOH is added prior to the addition of the chain terminator. However, the chain terminator was added sufficiently early that the continued presence of phosgene in the reaction system is assumed.

The addition of the chain terminator at a point at which no phosgene remains in the reaction system would mean a reaction product R having an even higher average molecular weight. An even higher proportion of oligomers would therefore be expected.

Example 2

The apparatuses employed for the individual process steps were as follows:

Process step (A): Disperser in the form of a perforated-plate nozzle with a predisperser (having a perforated plate having 5 bores, each of 2.5 mm diameter, at a perforated-plate thickness of 2.35 and a pressure drop of 0.2 bar at a flow rate of 5.2 m/s), 26 ms residence time in the predispersing space, and subsequent dispersing (with a further perforated plate having 18 bores, each of 1.5 mm in diameter, at a perforated-plate thickness of 2.35 mm and a pressure drop of 0.8 bar at a flow rate of 8.9 m/s) through which one liquid is dispersed into the other.

Process step (B): A dwell-time reactor having a residence time of 0.2 s.

Process step (C): A pumped-circulation reactor fitted with a metered addition point (e.g. for NaOH; in comparative experiment 2b, 20% of the NaOH used was added here), a pump, a heat exchanger, an overflow vessel, and a T-shaped withdrawal point having a volume of 140 l, fitted with a pH probe and a conductivity probe; redispersion takes place on entry into the pumped-circulation reactor; in example 2a the chain extender is added to the pumped-circulation reactor.

Process step (D): A discharge pump with upstream metered addition points for chain terminators (in comparative experiment 2b the chain terminator is added here; in experiment 2a nothing is added here) and NaOH solution, a static mixer between them, downstream thereof a helical-tube reactor having mixing and dwell zones and a total volume of 60 l (first dwell reactor) and downstream thereof a further helical-tube reactor (second dwell reactor) having a metered addition point for catalyst at the beginning of the reactor and a total volume of 801.

Subsequent phase separation: Separation vessel (size 4.15 $m^3$ at a fill level of 50%).

The following material streams were used in process step (A):

600 kg/h aqueous bisphenol solution (15% by weight of a mixture of bisphenol A and bisphenol TMC based on the total weight of the solution, 2.13 mol NaOH/mol bisphenol solution)

44.6 kg/h phosgene 520 kg/h solvent mixture composed of 54% by weight methylene chloride and 46% by weight chlorobenzene No further material streams were additionally used in process step (B) and (C).

In process step (D) the following material streams were additionally employed upstream of the first dwell reactor:

17.8 kg/h t-butylphenol solution (20% by weight, in a solvent mixture composed of 54% by weight methylene chloride and 46% by weight chlorobenzene)

35 kg/h aqueous NaOH solution containing 32% by weight NaOH

In process step (D) the following material stream was additionally employed in the second dwell reactor:

22.7 kg/h catalyst solution (3% by weight solution, ethylpiperidine in a solvent mixture of 54% by weight methylene chloride and 46% by weight chlorobenzene)

The temperature in the pumped-circulation reactor was between 35° C. (downstream of the heat exchanger) and 38° C. (upstream of the heat exchanger). The temperature in the helical-tube reactors in process step (D) was 37° C. in each case and in the separation vessel was 35° C.

The dispersion direction was set such that the organic phase was dispersed into the aqueous phase.

Table 2 summarizes the results obtained.

TABLE 2

| | MnLoop g/mol | App. T ° C. | Diff. in MWD area % | Di-chain terminator carbonate (PC) ppm | CO3 % by weight | Mn (PC) g/mol | Mw (PC) g/mol |
|---|---|---|---|---|---|---|---|
| Example 2a | <900* | 60 | 3.50 | 200 | 0.75 | 12 017 | 31 650 |
| Comparative example 2b | 2320 | 60 | 5.00 | <50 | 0.76 | 10 244 | 29 030 |

*estimated value

MnLoop: Molecular weight at addition of chain terminator

Diff. in MWD (PC): Difference distribution; see above

Example 2a shows the addition of the chain terminator at a point at which the reaction product R comprises a mixture of compounds having an average molar mass MnLoop of below 900 g/mol. In comparative example 2b, the chain terminator was added at a point at which the reaction product R comprises a mixture of compounds having an average molar mass MnLoop of 2320 g/mol.

It can be seen that in the example of the invention, the resulting polycarbonate has a higher proportion of di-chain terminator carbonate than in comparative example 2b. Nevertheless, the content is within an acceptable range. However, the example of the invention has a significantly lower value for oligomers (measured through diff. in MWD).

What is claimed is:

1. A process for producing polycarbonate by an interfacial process from at least one dihydroxydiarylalkane, phosgene, at least one catalyst, and at least one chain terminator, wherein (i) the at least one chain terminator is introduced into a reaction system comprising at least the at least one dihydroxydiarylalkane, the phosgene, and a reaction product R of the at least one dihydroxydiarylalkane and the phosgene at a point at which the reaction product R is a mixture of compounds and these compounds on average have a degree of polymerization of at least one unit and at most three units formed from the at least one dihydroxydiarylalkane by the reaction with the phosgene; and (ii) the process comprises the step of at least one addition of an aqueous alkali metal hydroxide solution, wherein the addition of the at least one chain terminator to the reaction system in process step (i) takes place prior to the first of the one or more additions of the aqueous alkali metal hydroxide solution.

2. The process as claimed in claim 1, wherein the compounds of the mixture of the reaction product R are represented by the general chemical formula (I):

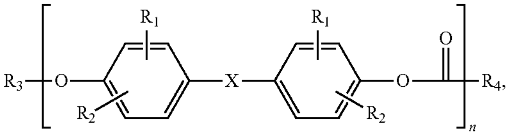

(I)

in which $R_1$ and $R_2$ independently represent H, C1 to C18 alkyl, C1 to C18 alkoxy, halogen, or in each case optionally substituted aryl or aralkyl, $R_3$ represents H, (C═O)—Cl or (C═O)—OH, $R_4$ represents OH or Cl, X represents a single bond, —$SO_2$—, —CO—, —O—, —S—, C1 to C6 alkylene, C2 to C5 alkylidene or C5 to C6 cycloalkylidene, which may be substituted by C1 to C6 alkyl, or else represents C6 to C12 arylene, and n represents the degree of polymerization and thus the number of units formed from the at least one dihydroxydiarylalkane by the reaction with the phosgene, wherein n has an average value of 1 to 3.

3. The process as claimed in claim 1, wherein the process comprises the following steps:

(a) generating a dispersion from an organic and an aqueous phase, wherein the organic phase comprises at least one solvent suitable for the polycarbonate and at least a portion of the phosgene, and wherein the aqueous phase comprises the at least one dihydroxydiarylalkane, water and 1.8 mol to 2.2 mol of aqueous alkali metal hydroxide solution per mol of dihydroxydiarylalkane, (b) generating the reaction system comprising at least the reaction product R from the at least one dihydroxydiarylalkane and the phosgene in the dispersion obtained from step (a) through reaction of the at least one dihydroxydiarylalkane and the phosgene, and (c) adding at least one chain terminator to the reaction system of step (b), wherein unreacted phosgene is still present in the reaction system of step (b).

4. The process as claimed in claim 3, wherein the process additionally comprises the following step:

(e) performing at least one addition of at least one catalyst.

5. The process as claimed in claim 1, wherein the reaction system at the beginning of the reaction contains an excess of phosgene relative to the sum of the employed dihydroxydiarylalkanes of 3 to 20 mol %.

6. The process as claimed in claim 1, wherein the process is operated continuously.

7. The process as claimed in claim 1, wherein the at least one catalyst is selected from the group consisting of a tertiary amine and an organophosphine.

8. The process as claimed in claim 1, wherein the at least one chain terminator is selected from the group consisting of phenol, alkylphenols, and chlorocarbonic esters thereof or acid chlorides of monocarboxylic acids.

9. The process as claimed in claim 2, wherein $R_1$ and $R_2$ independently represent H or C1 to C12 alkyl.

10. The process as claimed in claim 2, wherein $R_1$ and $R_2$ independently represent H or $C_1$ to $C_8$ alkyl.

11. The process as claimed in claim 2, wherein $R_1$ and $R_2$ independently represent H or methyl.

12. The process as claimed in claim 2, wherein X represents a single bond, —$SO_2$—, —CO—, —O—, —S—, C1 to C6 alkylene, C2 to C5 alkylidene or C5 to C6 cycloalkylidene, which may be substituted by methyl or ethyl, or else represents C6 to C12 arylene.

13. The process as claimed in claim 2, wherein X represents a single bond, —$SO_2$—, —CO—, —O—, —S—, C1 to C6 alkylene, C2 to C5 alkylidene or C5 to C6 cycloalkylidene, which may be substituted by C1 to C6 alkyl, or else represents C6 to C12 arylene fused to further aromatic rings containing heteroatoms.

14. The process as claimed in claim 3, wherein the aqueous phase comprises the at least one dihydroxydiarylalkane, water and 1.95 mol to 2.05 mol of aqueous alkali metal hydroxide solution per mol of dihydroxydiarylalkane.

15. The process as claimed in claim 3, wherein the process comprises (d) performing at least one addition of alkali metal hydroxide solution to the mixture obtained from step (c).

16. The process as claimed in claim 8, wherein the at least one chain terminator is selected from the group consisting of phenol, tert-butylphenol, isooctylphenol, and cumylphenol.

17. The process as claimed in claim 1, wherein the addition of the at least one chain terminator to the reaction system in process step (i) takes place when the reaction system comprises unreacted phosgene.

18. The process as claimed in claim 1, wherein a branching agent or branching mixture is not introduced into the reaction system.

* * * * *